United States Patent [19]

Rocchio et al.

[11] 4,211,200
[45] Jul. 8, 1980

[54] VACUUM FORCE AMPLIFIER FOR INTERNAL COMBUSTION ENGINE

[75] Inventors: Rodolfo Rocchio, Ingolstadt; Fritz Naumann, Stammham; Heinrich Strotkötter, Ingolstadt, all of Fed. Rep. of Germany

[73] Assignee: Audi Nsu Auto Union Aktiengesellschaft, Ingolstadt, Fed. Rep. of Germany

[21] Appl. No.: 897,417

[22] Filed: Apr. 18, 1978

[30] Foreign Application Priority Data

Apr. 21, 1977 [DE] Fed. Rep. of Germany ....... 2717685

[51] Int. Cl.$^2$ ..................... F02M 39/00; B60T 13/00
[52] U.S. Cl. .................... 123/445; 417/197; 417/159; 261/41 D; 188/356; 60/547 R; 91/31; 123/495
[58] Field of Search ............... 123/139 A; 417/197, 417/159, 167; 261/41 D; 188/356, 357; 60/547 R, 397, 411; 91/31

[56] References Cited

U.S. PATENT DOCUMENTS

| | | | |
|---|---|---|---|
| 992,144 | 5/1911 | Babcock | 417/197 |
| 1,374,491 | 4/1921 | Coulombe | 417/167 |
| 1,753,166 | 4/1930 | Bragg et al. | 188/357 |
| 2,075,231 | 3/1937 | Schimanek | 123/124 R |
| 3,503,594 | 3/1970 | Goto | 261/41 D |
| 3,520,639 | 7/1970 | Hanes | 417/167 |
| 3,944,634 | 3/1976 | Gerlach | 261/41 D |

FOREIGN PATENT DOCUMENTS 1290014 2/1962 France .

*Primary Examiner*—Ira S. Lazarus
*Assistant Examiner*—Magdalen Moy
*Attorney, Agent, or Firm*—Karl F. Ross

[57] ABSTRACT

The air intake of an internal-combustion engine passes through a throttle whose upstream and downstream sides are shunted by an idle-speed circuit. A vacuum-actuated auxiliary device has a vacuum line connected to the downstream side of the throttle. An injector-type jet pump connected in the idle circuit has an outlet connected to the downstream side of the throttle, a high-pressure inlet connected to the upstream side of the throttle, and a low-pressure input connected to the vacuum line. This jet pump serves as a vacuum amplifier during low-speed engine operation to ensure sufficient vacuum to drive the auxiliary load.

7 Claims, 2 Drawing Figures

VACUUM FORCE AMPLIFIER FOR INTERNAL COMBUSTION ENGINE

FIELD OF THE INVENTION

The present invention relates to an internal-combustion system having a vacuum-operated auxiliary device. More particularly this invention concerns a motor vehicle wherein the power brakes and other auxiliary equipment is operated off the vacuum from the engine intake manifold.

BACKGROUND OF THE INVENTION

It is a standard practice in an automotive vehicle to power an auxiliary device such as a power-brake force amplifier, a clutch, a central door and window locking system, or the like by the vacuum in the intake of the motor-vehicle internal-combustion engine. In particular modern pollution-control devices frequently lower the intake-manifold pressure, particularly when the engine is idling. Thus, in modern engines it is frequently necessary to provide a separate vacuum pump for the above-mentioned auxiliary devices, or to make them all hydraulic and to provide a separate hydraulic pump therefor. This problem is particularly critical with respect to power brakes, as such auxiliary devices normally require considerable vacuum and at the same time must function even when the engine speed is very low.

U.S. Pat. No. 1,374,491 of Apr. 12, 1921 shows a suction-augmenting device usable immediately upstream of the throttle in an internal-combustion engine. Thus a jet-pump arrangement is provided immediately upstream of the throttle, so that even when the engine is operating at low speeds the suction is effectively amplified. Such an arrangement has proven itself unsatisfactory in practice, as the arrangement considerably blocks the throat or flow cross-section of the air intake for the engine. Thus the suction-augmenting device limits the amount of air that can be taken in even at high engine speeds and correspondingly reduces the top speed for the engine.

In U.S. Pat. No. 2,075,231 of Mar. 30, 1937 an engine is described wherein a pressure sensor in the intake manifold can completely shut off the fuel supply during certain types of engine operation. This patent also discloses a rather complex idle-speed circuit, that is a line which feeds some fuel to the engine even when the throttle valve is almost completely closed, which can shut itself down completely during certain operating conditions. This arrangement does not lend itself, however, to the operation of any auxiliary devices.

An engine is described in French Pat. No. 1,290,074 of Feb. 26, 1962 wherein the pressure from the intake line is used to control the throttle valve with flow of fuel to the engine. Such an arrangement, however, does not overcome the above-given disadvantages.

OBJECTS OF THE INVENTION

It is therefore an object of the present invention to provide an improved internal-combustion engine system.

Another object is the provision of such a system wherein even at very low engine speed sufficient vacuum can be created to drive even a relatively heavy-duty auxiliary device, such as a power-brake force amplifier.

Yet another object is to overcome the above-given disadvantages of the known systems.

SUMMARY OF THE INVENTION

These objects are attained according to the instant invention by providing an internal-combustion engine system with a jet pump in the idler circuit that shunts the upstream and downstream sides of the throttle of the engine. This jet pump is of the injector type and has an output connected to the downstream side of the throttle, a high-pressure input connected to the upstream side of the throttle, and a low-pressure input connected to the vacuum line that runs between the downstream side of the throttle and the auxiliary vacuum-actuated device of the engine system. Thus at low engine speed, when a relatively great pressure differential exists across the throttle and virtually all flow to the engine is through the idle circuit, the instant invention ensures jet-pumping action which will create sufficient suction to operate even a relatively heavy-duty device such as a power-brake force amplifier.

According to further features of this invention the jet pump has an outer tube which forms a part of the idle-speed circuit, and which is formed internally with a convergent-divergent nozzle of the De Laval type having one side turned toward the outlet and another side turned toward the two inlets. The inlet connected to the suction line of the auxiliary device is constituted as a tapered nozzle opening into the convergent-divergent formation, and the other inlet is constituted by the annular space surrounding the nozzle.

Furthermore according to this invention the above-described nozzle is displaceable axially toward and away from the divergent-convergent formation for varying the flow cross-section of the idle-speed circuit and similarly for varying the suction amplification achieved by this system.

It is also within the scope of this invention to provide a bypass line shunting the above-described jet pump and itself provided with a variable restriction allowing the idle speed to be adjusted independently of the suction amplification.

The suction line is provided according to this invention with a check valve permitting a flow only into the intake line of the system downstream of the throttle thereof. Another such check valve may be provided between the auxiliary device on one side and the intake manifold and jet pump on the other.

SPECIFIC DESCRIPTION

Figure 1:
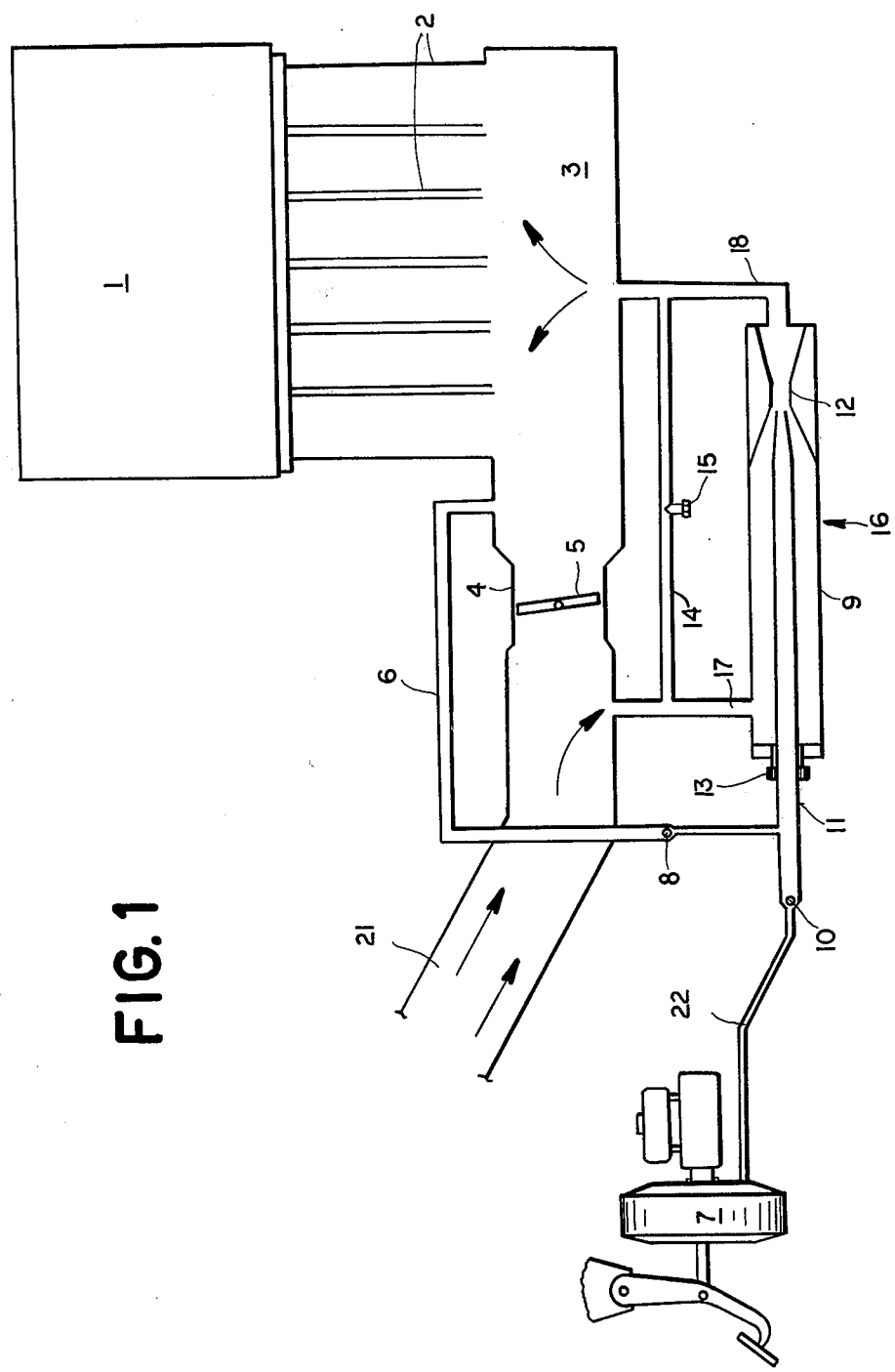
FIG. 1 is a largely schematic view illustrating the system according to this invention.

As shown in FIG. 1 an internal-combustion engine 1 has six cylinder intakes 2 all meeting at an intake manifold 3. A butterfly-type throttle 5 is provided in a restriction 4 in the air-intake conduit 21 leading from this manifold 3 to the vehicle air filter and the other fuel-control devices of the arrangement.

A power-brake force amplifier 7 is connected via a first suction line 22 provided with a check valve 10 and a second suction line 6 provided with a check valve 8 to the air intake downstream of the throttle valve 5. In addition an idle-speed circuit 9 is provided connected across the throttle valve 5 and provided with a jet pump 16 having an input 11 connected to suction lines 6 and 22, an intake 17 connected upstream of the valve 5, and an outlet 18 connected downstream of the valve 5. Finally a by-pass conduit 14 with a variable restriction constituted as a screw 15 is provided shunting the jet pump 16 of the idle-speed circuit 9.

Figure 2:
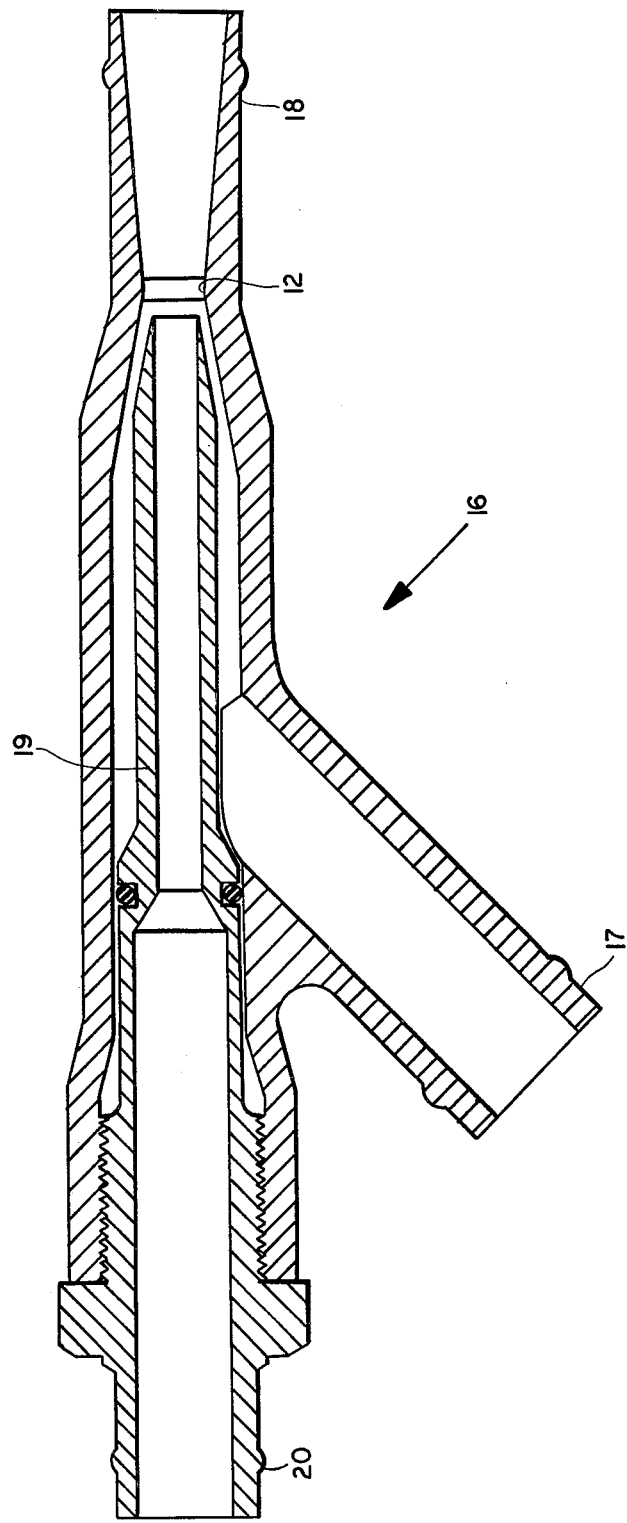
FIG. 2 is a large-scale view of a detail of FIG. 1.

As shown in more detail in FIG. 2 the jet pump 16 has a convergent-divergent restriction 12 of the De Laval type. A nozzle 19 having a tapered end opens immediately upstream of this restriction 12, the downstream side of which forms the outlet 18. Furthermore an obliquely opening nipple 7 is formed to constitute the upstream high-pressure inlet of the jet pump 16. Nipple 20 constitutes the low-pressure inlet connected via line 11 to the suction lines 6 and 22. A nut 13 is provided on the nozzle 19 to allow axial displacement of this nozzle by screwing of it relative to the rest of the jet pump 16. In this manner the suction amplification achieved in the jet pump 16 can be varied, as can the flow cross-section of the idle circuit 9.

When the engine is operating at high speed there is little pressure differential between the upstream and downstream sides of the throttle 5, both being under considerable vacuum. This vacuum is always sufficient for operating the force amplifier 7 of the vehicle power brakes.

During idling, however, the pressure in the intake manifold 3 is relatively low. There is, however, a considerable pressure differential across the valve 5, and considerable flow through the idle-speed circuit 9. This flow is used jet-pump fashion to create a considerable vacuum in the nozzle 19 which is therefore sufficient to operate the power brakes 7.

Under normal use the nut 13 is adjusted to achieve the desired vacuum amplification at low engine speeds. The valve 15, however, serves merely as the idle-speed adjustment.

We claim:

1. A system comprising:
    an internal-combustion engine having a throttle through which intake air passes and having an upstream side and a downstream side;
    an idle-speed circuit shunting said upstream and downstream sides of said throttle;
    an injector-type jet pump in said idle circuit having an output connected to said downstream side, a high-pressure input connected to said upstream side, and a low-pressure input; and
    a vacuum-actuated auxiliary device having a vacuum line connected to said low-pressure input.

2. The system defined in claim 1, further comprising a check valve between said pump and said device on one side and said downstream side on the other side.

3. The system defined in claim 1, further comprising means for varying the flow cross-section of said idle-speed circuit.

4. The system defined in claim 3 wherein said means for varying includes a nozzle in said pump constituting said low-pressure inlet, a restriction surrounding said nozzle, and means for displacing said nozzle relative to said restriction.

5. The system defined in claim 3 wherein said idle-speed circuit includes a bypass line shunting said pump and said means for varying includes a variable restriction in said bypass line.

6. The system defined in claim 1 wherein said pump is formed as a convergent-divergent nozzle having a convergent-divergent restriction opening to one side toward said high-pressure input and to the other side toward said output, and a nozzle constituting said low-pressure inlet opening centrally into said restriction.

7. The system defined in claim 1 wherein said device is a power-brake force amplifier and said system is adapted for use in an automotive vehicle.

* * * * *